JOHN KAISER.

Improvement in Adjusting Car Wheels upon Axles.

No. 123,913.  Patented Feb. 20, 1872.

Witnesses,
M. B. Harding
Thos. McIlvain

John Kaiser
by his Attys.
Howson and Son

123,913

UNITED STATES PATENT OFFICE.

JOHN KAISER, OF WILMINGTON, DELAWARE, ASSIGNOR TO LOBDELL CAR-WHEEL COMPANY, OF SAME PLACE.

IMPROVEMENT IN ADJUSTING CAR-WHEELS UPON AXLES.

Specification forming part of Letters Patent No. 123,913, dated February 20, 1872.

Specification describing Mechanism for Adjusting and Securing Car-Wheels on Axles, invented by John Kaiser, of Wilmington, county of Newcastle, State of Delaware.

My invention relates to improvements in mechanism, too fully described hereafter to need preliminary explanation, whereby car-wheels may be secured to the different positions on the axles, demanded by changes of gauge.

Figure 1:
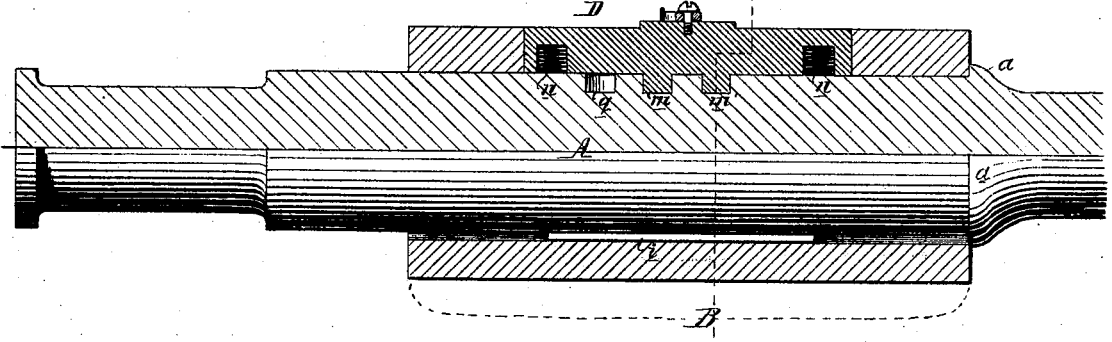
Figure 3:
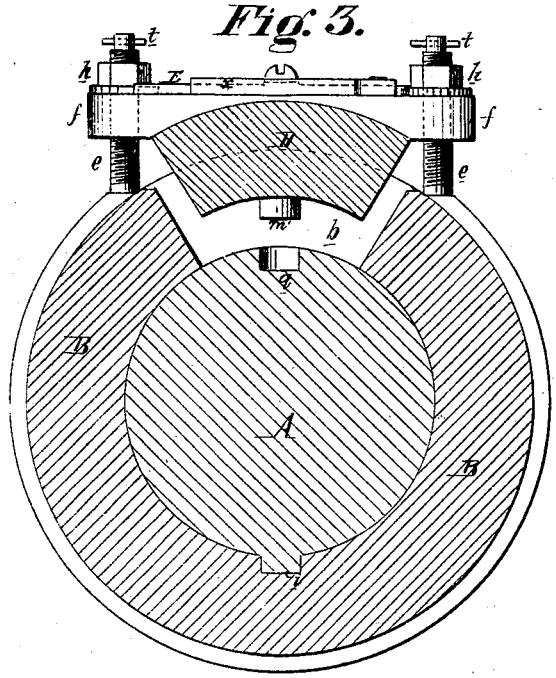
Figure 2:
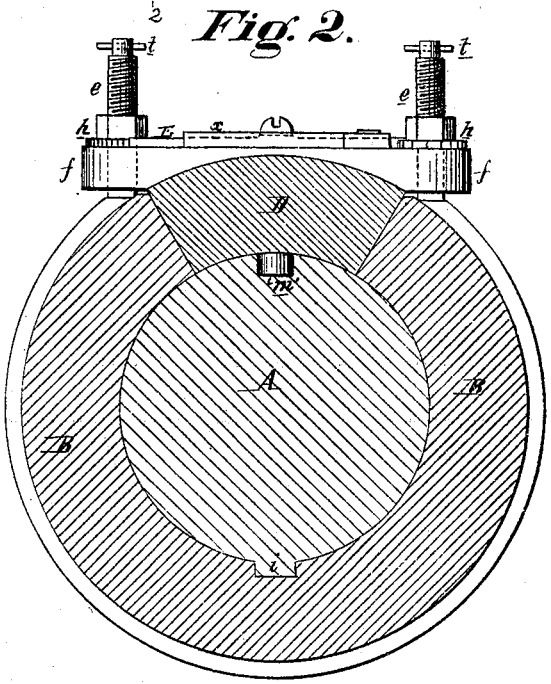
Figure 4:
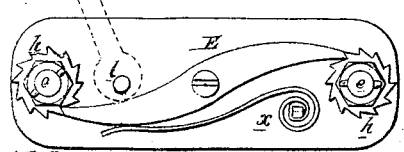
Figure 5:
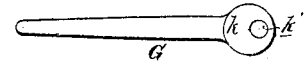

In the drawing, Figure 1 is a longitudinal section of my mechanism for adjusting and securing car-wheels on axles; Fig. 2, a vertical section on the line 1 2, Fig. 1; Fig. 3, the same as Fig. 2, with the clamping-box in a different position; Fig. 4, a plan view of part of Fig. 2; and Fig. 5, a view of an instrument to be used in connection with part of the mechanism.

A represents a portion of a car-axle, to which is fitted the hub, B, of a car-wheel, the inner end of the hub bearing against the collar $a$ of the axle when the wheel has been adjusted for a narrow gauge. A recess, $b$, of the form best observed in Fig. 3, is formed in the hub B, and into this recess projects a clamping-box, D, through the flanges $ff$ of which pass bolts $e\,e$, attached to the hub. When the nuts $h\,h$ of these bolts are screwed down, as shown in Fig. 2, the clamping-box D will fit the recess $b$ of the hub; but not too tightly to prevent the box from bearing hard on the axle, for it should be understood that one of the duties of this box is to act as a clamping medium for securing the hub of the wheel to the axle on tightening the nuts $h\,h$. In addition to this mode of securing the hub to the axle, the latter is provided with a key or feather, $i$, adapted to a groove in the hub, and the clamping-box D is provided, on the under side, with projections $m\,m'$, (two in the present instance,) which, when the box is depressed, enter two or three corresponding orifices in the axle. It is these projections and orifices which determine the longitudinal position of the wheel on the axle.

As shown in Fig. 1, the wheel is adjusted for a narrow gauge. When it has to be moved to the position required for a broad gauge, the nuts $h\,h$ are unscrewed, and the box D will follow the nuts, owing to the spiral springs $n\,n$ contained in pockets in the under side of the box. The axle is thus relieved from the clamping control of the box D, and also from the control of the projections $m\,m$ on the under side of the box, and the wheel is at liberty to be moved along the axle until the projection $m'$ of the box D coincides with the orifice $q$, and the projection $m$ coincides with the orifice which previously contained the projection $m$, when the nuts $h\,h$ are again screwed down, and the box D is again caused to clamp the hub to the axle. In no case will it be necessary, in effecting the desired changes, to entirely detach the nuts $h\,h$ from the bolts $e\,e$; in fact, the latter are provided with transverse split pins $t\,t$, to prevent the detaching and loss of the nuts, the bolts being of sufficient length to permit the nuts to be unscrewed to the extent desired.

It will be seen that by the use of the screw and nuts a positive adjustment of the box is effected, so that, unless the nuts are disturbed, there is no possibility of the wheel becoming loose or being displaced. In order to retain the nuts when they have been screwed tight, I prefer the device illustrated in Fig. 4, on referring to which it will be observed that each nut is provided at the bottom with a flange having teeth, the end of one arm of the double pawl E being adapted to the teeth of one nut, and the end of the opposite arm to the teeth of the other nut. This double pawl is hung to a pin projecting from the top of the box D, and is so acted on by a spring, $x$, that its points are caused to bear against the toothed flanges of the nuts. When the latter have to be unscrewed, however, the points of the double pawl must be moved back from the nuts, and must be retained in a position where they cannot interfere with the free turning of the said nuts. In order to accomplish this, I prefer to use the instrument shown in Fig. 5, the said instrument consisting of a lever, G, the enlarged end of which is made in the form of an eccentric, $k$, the hole $k'$ of the latter being adapted to a pin, $l$, fixed to the top of the clamping-box at the point shown in Fig. 4. On adjusting the instrument to the pin $l$, as shown by dotted lines, and then moving the lever, the eccentric $k$ will so act on the double pawl that its point will be moved away from and cease to control the nuts, which are at liberty to be turned by any suitable wrench.

I am aware that the hubs of car-wheels have been recessed to receive adjustable pins or plates adapted to recesses in the axle, and I do not claim this, broadly; but

I claim—

1. The combination of the recessed hub B, adjustable box D, having projections adapted to recesses in the axle, the screws $e\ e$ passing through flanges on the block, nuts $h$ and devices described, or their equivalents, for preventing the turning of the nuts, all arranged and operating as described.

2. The combination of the clamping-box described and its projections $m\ m'$, with springs $n\ n$, bearing on the axle.

In testimony whereof I have signed my name to this specification in the presence of two subscribing witnesses.

JOHN KAISER.

Witnesses:
   CHARLES MCCLOSKEY,
   GEORGE O'NEILL.